(12) United States Patent
Tsai et al.

(10) Patent No.: US 11,208,195 B2
(45) Date of Patent: Dec. 28, 2021

(54) TRACK OVER-TRAVEL ARRESTMENT MECHANISM FOR AUXILIARY SUPPORTS

(71) Applicant: The Boeing Company, Chicago, IL (US)

(72) Inventors: Kevin R. Tsai, Seattle, WA (US); Bryan J. Gruner, Bellevue, WA (US)

(73) Assignee: The Boeing Company, Chicago, IL (US)

(*) Notice: Subject to any disclaimer, the term of this patent is extended or adjusted under 35 U.S.C. 154(b) by 482 days.

(21) Appl. No.: 16/355,478

(22) Filed: Mar. 15, 2019

(65) Prior Publication Data

US 2020/0290722 A1 Sep. 17, 2020

(51) Int. Cl.
*B64C 9/02* (2006.01)

(52) U.S. Cl.
CPC ..................................... *B64C 9/02* (2013.01)

(58) Field of Classification Search
CPC .. B64C 7/00; B64C 13/14; B64C 5/08; B64C 9/18; B64C 3/50; B64D 2045/001; B64D 2045/0085

USPC ......................................................... 244/224
See application file for complete search history.

(56) References Cited

U.S. PATENT DOCUMENTS

| | | | | |
|---|---|---|---|---|
| 2,836,380 A | * | 5/1958 | Pearson | B64C 9/16 244/216 |
| 3,940,093 A | * | 2/1976 | Cabriere | B64C 9/24 244/203 |
| 2017/0334582 A1 | * | 11/2017 | Huang | B64F 5/60 |
| 2019/0176959 A1 | * | 6/2019 | Poloni | B64C 3/26 |
| 2020/0290724 A1 | * | 9/2020 | Custance | B64C 9/02 |

\* cited by examiner

*Primary Examiner* — Richard R. Green
*Assistant Examiner* — William L Gmoser
(74) *Attorney, Agent, or Firm* — Felix L. Fischer

(57) ABSTRACT

A system to arrest flap over-travel employs a track extending from a flap and engaging an auxiliary support. The track has a deployment profile determining flap motion relative to the support structure during travel between an extended position and a normal retracted position. The deployment profile has a transition portion extending beyond the normal retracted position and terminating in a detent. A resiliently mounted catcher is configured to be displaced by the transition portion during over-travel of the flap beyond the normal retracted position and captured in the detent in a maximum retracted position thereby restraining the flap.

20 Claims, 13 Drawing Sheets

TRACK OVER-TRAVEL ARRESTMENT MECHANISM FOR AUXILIARY SUPPORTS

REFERENCE TO RELATED APPLICATIONS

This application is copending with U.S. application Ser. No. 16/355,522 filed on Mar. 15, 2019 entitled TRACK OVERTRAVEL ARRESTMENT MECHANISM.

BACKGROUND INFORMATION

Field

Embodiments of the disclosure relate generally to the field of aircraft flap extension systems and, more particularly to a mechanism associated with an auxiliary support for arresting over-travel in a trailing edge flap.

Background

Aircraft employ flaps which increase camber of the wings for enhanced aerodynamic efficiency in take-off and landing. Various mechanical arrangements have been developed to deploy the flaps over a range of retracted to extended positions. Flaps in the retracted position may extend forward into the trailing edge cove of the wing structure in certain over-travel situations. If primary load paths are not available, air load may deflect the flap further forward into the cove, which may create unintentional contact between parts. Maintaining a controlled flap position in the event of an over-travel condition is desirable to avoid flutter.

SUMMARY

Exemplary embodiments provide a system to arrest flap over-travel employing a track extending from a flap and engaging an auxiliary support. The track has a deployment profile determining flap motion relative to the support structure during travel between an extended position and a normal retracted position. The deployment profile has a transition portion extending beyond the normal retracted position and terminating in a detent. A resiliently mounted catcher assembly is configured to be displaced by the transition portion during over-travel of the flap beyond the normal retracted position and captured in the detent in a maximum retracted position thereby restraining the flap.

The implementations herein provide a method for arresting flap over-travel wherein a track extending from a flap is engaged to an auxiliary support, the track having a deployment profile determining flap motion relative to a support structure during travel between an extended position and a normal retracted position. The deployment profile has a transition portion extending beyond the normal retracted position. A resiliently mounted catcher is displaced in the transition portion of the deployment profile during over-travel of the flap beyond the normal retracted position. The resiliently mounted catcher is captured in a detent at a termination of the transition portion in a maximum retracted position thereby restraining the flap.

BRIEF DESCRIPTION OF THE DRAWINGS

The features, functions, and advantages that have been discussed can be achieved independently in various embodiments of the present invention or may be combined in yet other embodiments further details of which can be seen with reference to the following description and drawings.

DETAILED DESCRIPTION

Figure 1:
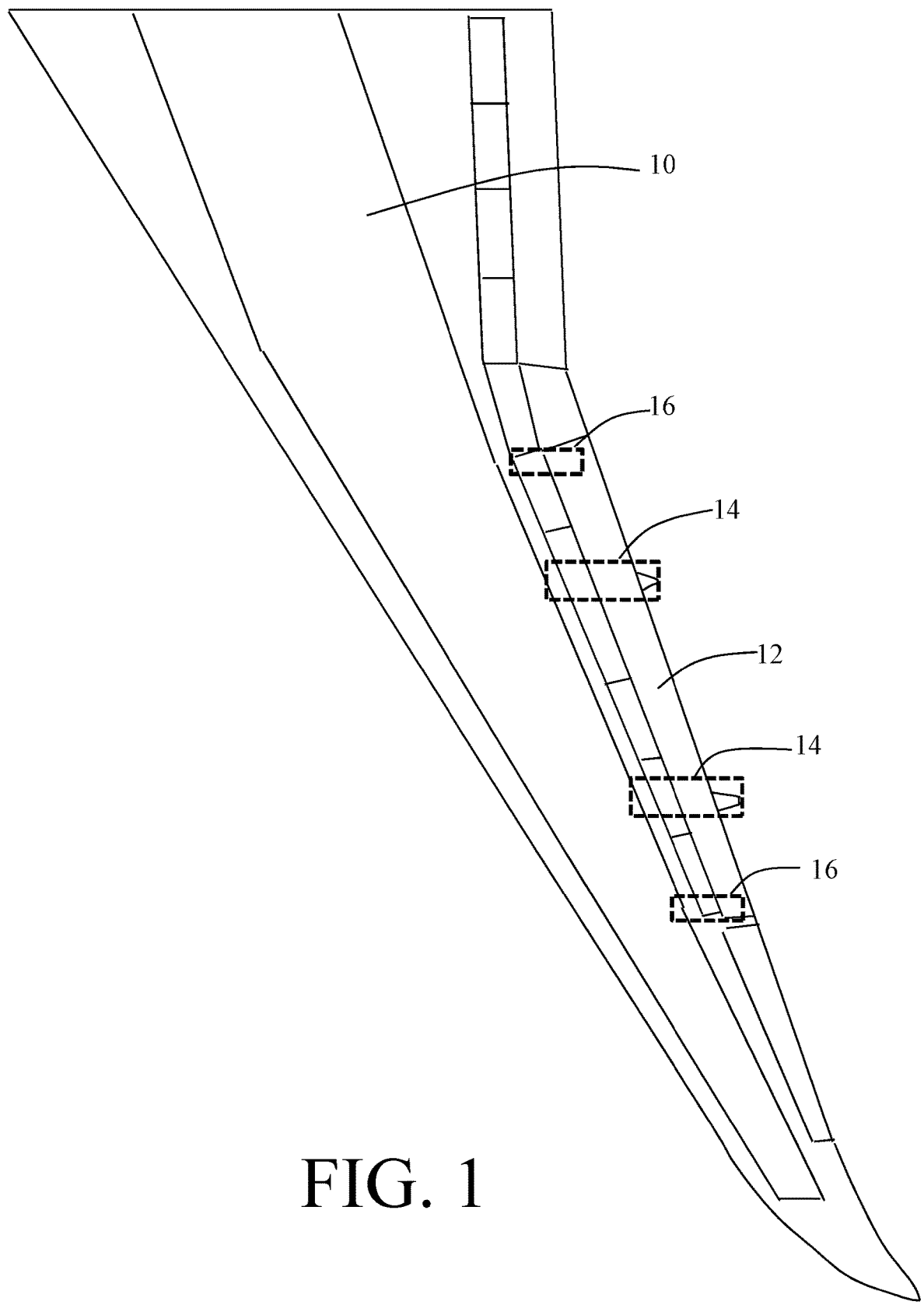
FIG. 1 is a representation of an aircraft wing in which the implementations disclosed herein may be employed.

The implementations described herein provide a system to arrest flap over-travel at both flap main and auxiliary supports or deflection control supports (referred to herein jointly as "auxiliary supports"). A track engages a flap to a support structure. The track has a deployment profile determining flap motion relative to the support structure during travel between an extended position and a normal retracted position. The deployment profile includes a transition portion extending beyond the normal retracted position and terminating in a detent. A resilient catcher is configured to be displaced by the transition portion during over-travel of the flap beyond the normal retracted position and captured in the detent in a maximum retracted position. Referring to the drawings, FIG. 1 shows an aircraft wing 10 having an example flap 12 mounted at main flap supports 14 and auxiliary supports 16. While the example flap 12 is depicted as an outboard flap the implementations herein are applicable to any flap configuration. The main flap supports 14 define the motion of the flap 12 and provide actuators to extend and retract the flap as well as a primary load path to react aerodynamic loads on the flap. The auxiliary supports 16 include deflection control and provide additional support for the flap over the range of motion. The auxiliary supports provide alternate load paths in the event primary load paths are not available.

Figure 2:
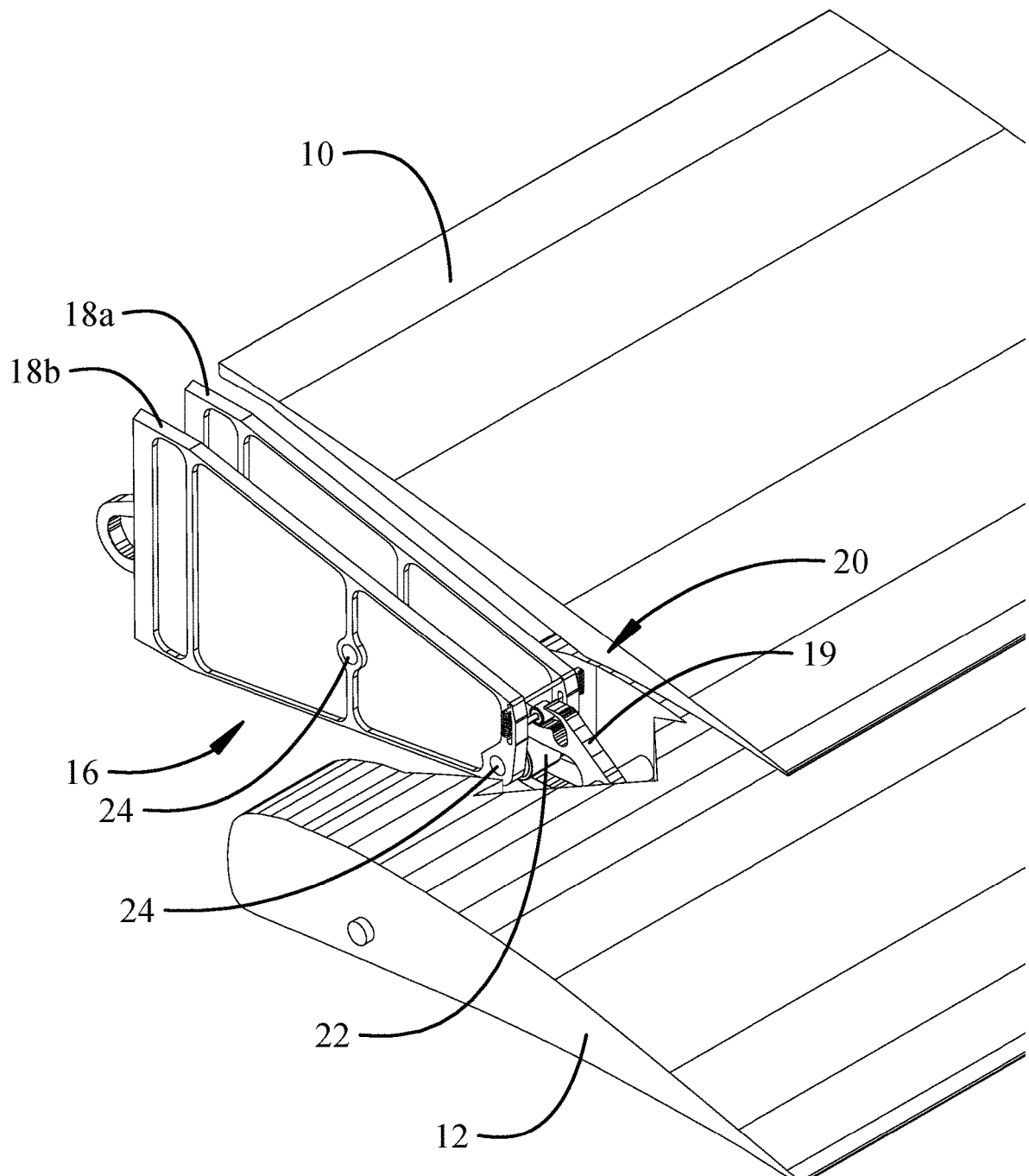
FIG. 2 is a pictorial representation of a first exemplary implementation for use with an auxiliary support control track with a portion of the flap cutaway.
Figure 3:
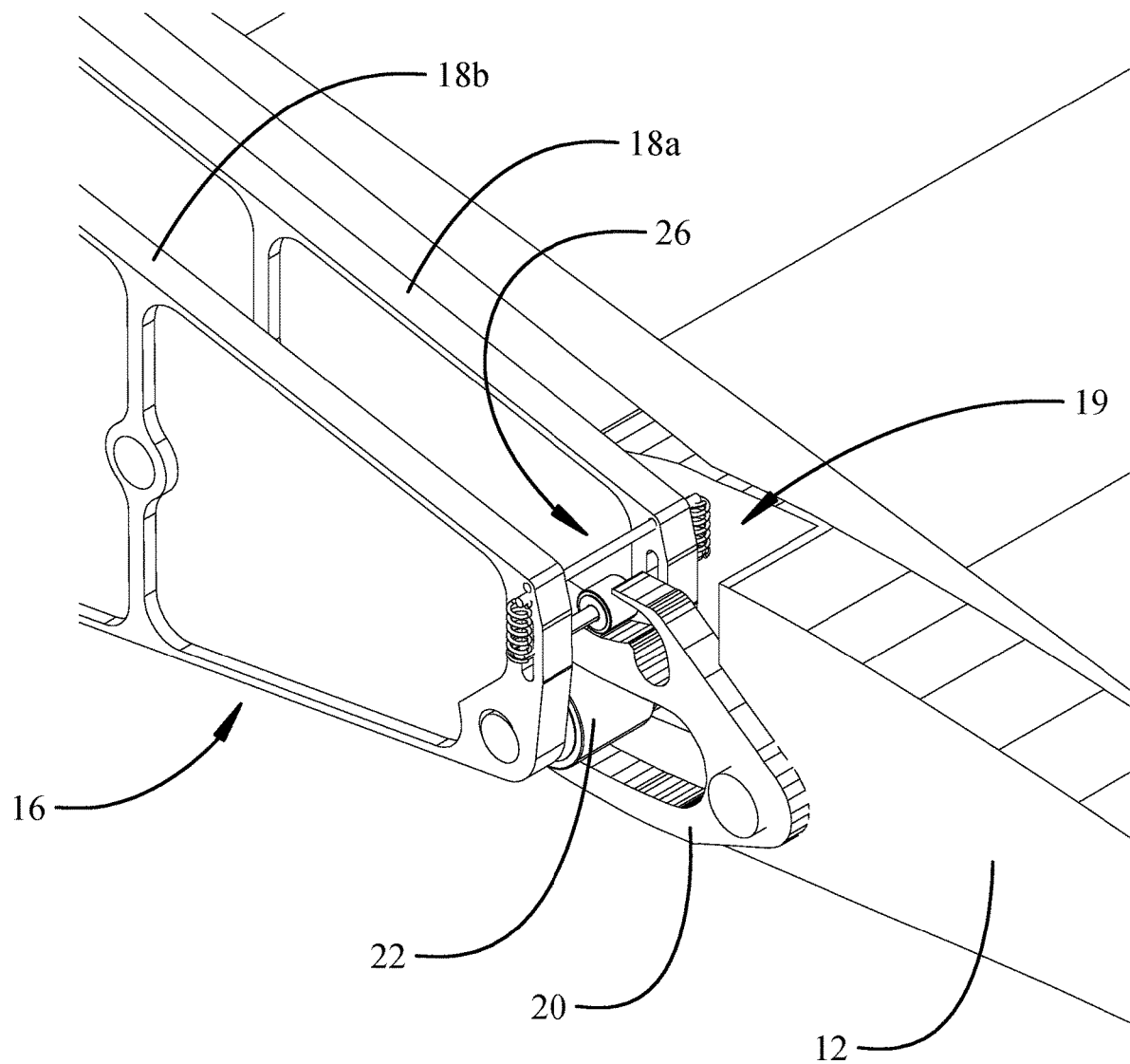
FIG. 3 is a detail pictorial representation of the engagement elements of the first exemplary implementation with the flap sectioned.
Figure 4:
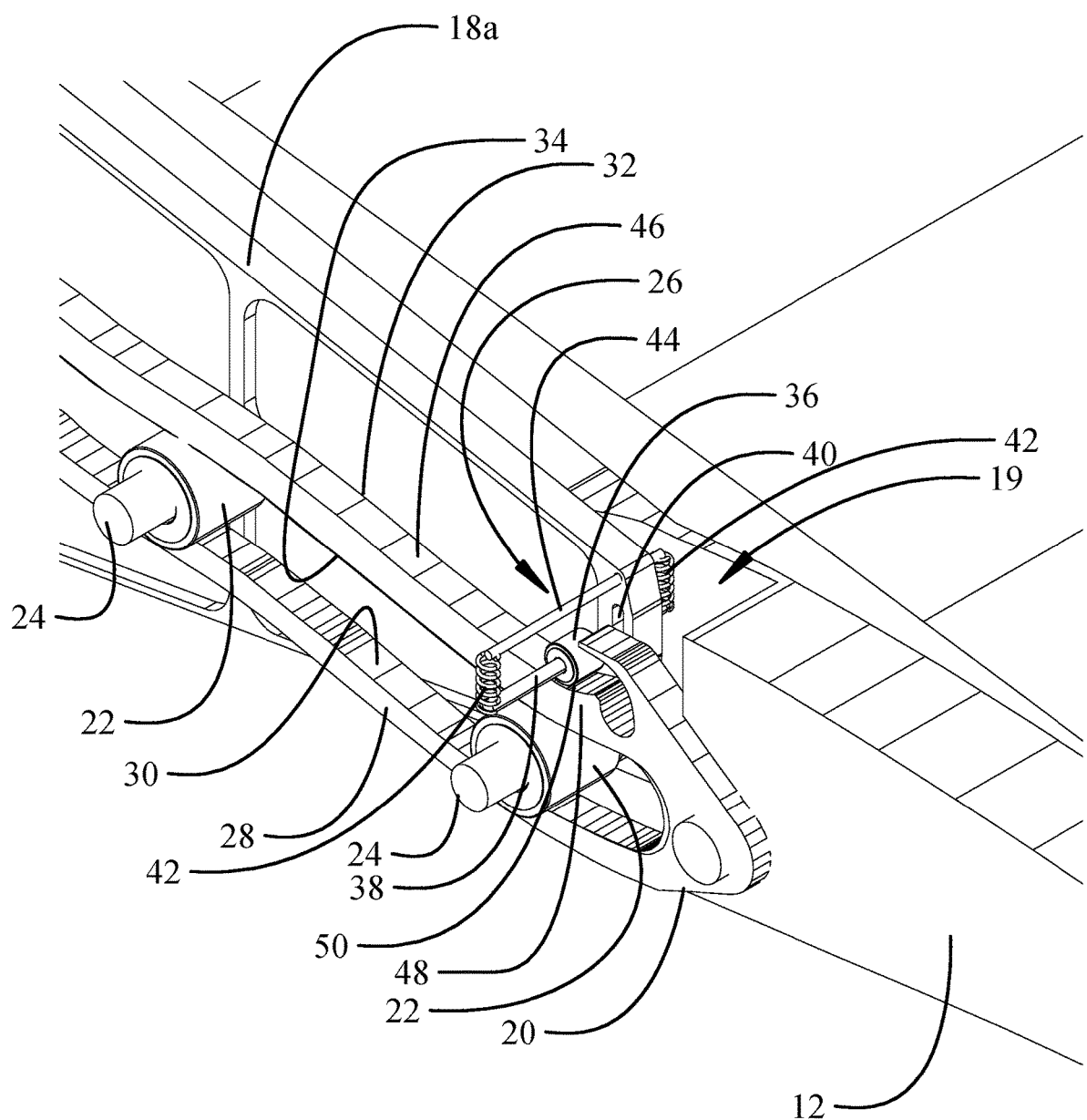
FIG. 4 is a detail pictorial representation of the first exemplary implementation with a rib removed for clarity.

An exemplary implementation of a flap over-travel arrest system 19 for use at the auxiliary supports 16 is shown in FIG. 2 with a portion of the flap cutaway to display the elements of the structure. The auxiliary support 16 engaged to structure of the wing 10 is formed in the exemplary implementation with an inboard rib 18a and an outboard rib 18b. A track 20, to be describe in greater detail subsequently, extending forwardly from the flap 12 is engaged on one or more air load rollers 22 supported on axles 24 between the inboard rib 18a and outboard rib 18b as seen in FIGS. 3 and 4. A catcher assembly 26 is supported between the inboard rib 18a and outboard rib 18b.

Figure 5:
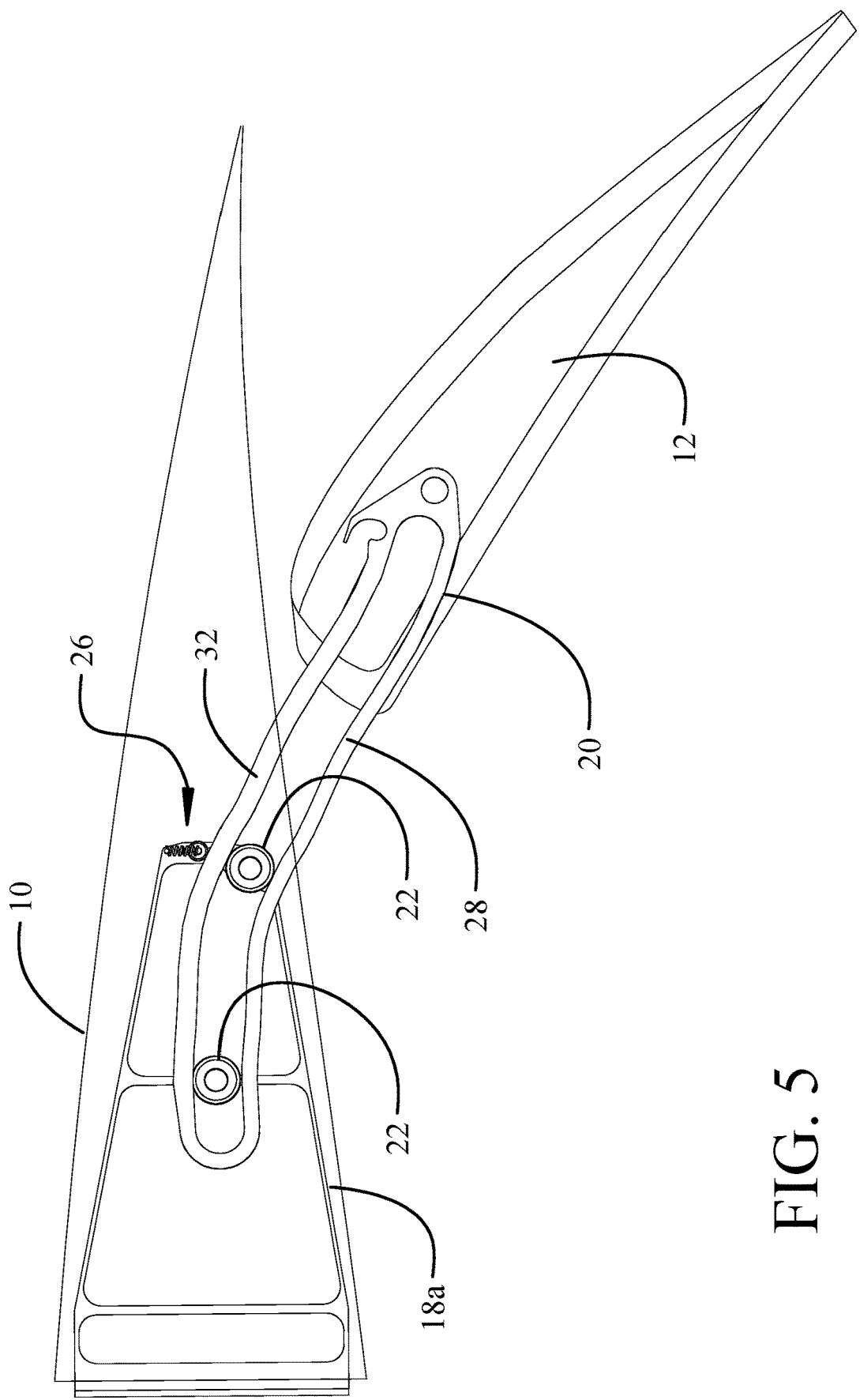
FIG. 5 is a side view of the first exemplary implementation with the flap in a fully extended position.
Figure 6:
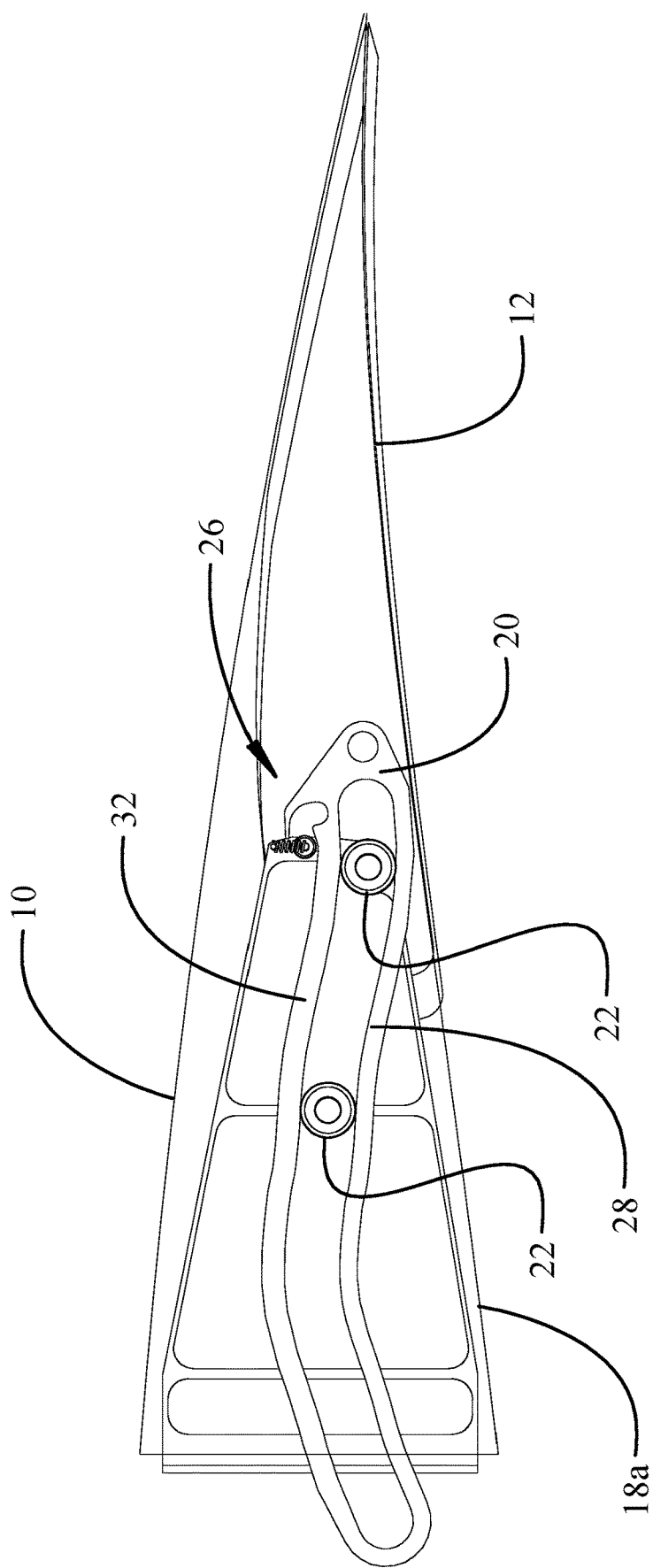
FIG. 6 is a side view of the first exemplary implementation with the flap in a normal retracted position.

As shown in FIG. 4, with the outboard rib removed for clarity, the track 20 (which may be an auxiliary support track or a deflection control track) has a lower flange 28 with a lower roller surface 30 and an upper flange 32 with an upper roller surface 34 which mirrors the lower roller surface to receive the air load roller 22. The deployment profile created by the track 20 with the lower flange 28 and upper flange 32 controls the position and orientation of the flap 12 over a range of motion from a fully extended position as seen in FIG. 5 to a fully retracted position as seen in FIGS. 4 and 6.

The catcher assembly 26, for the first exemplary implementation shown in FIG. 4, incorporates a catcher roller 36 resiliently carried on a catcher axle 38. The catcher axle 38 is received in guide slots 40 on the inboard rib 18a and outboard rib 18b. Resilient restraints such as springs 42, attached to the inboard rib 18a and outboard rib 18b with one or more pins 44, urge the catcher roller 36 vertically, with respect to a direction of travel of the flap 12, onto an upper surface 46 of the upper flange 32 of track 20. As a portion of the deployment profile of the track 20, the upper surface 46 of upper flange 32 includes a transition portion 48 having a ramp 50. The transition portion 48 terminates in a detent 52 sized to receive the catcher roller 36 in an overtravel capture position, as will be described in greater detail subsequently.

Figure 7A:
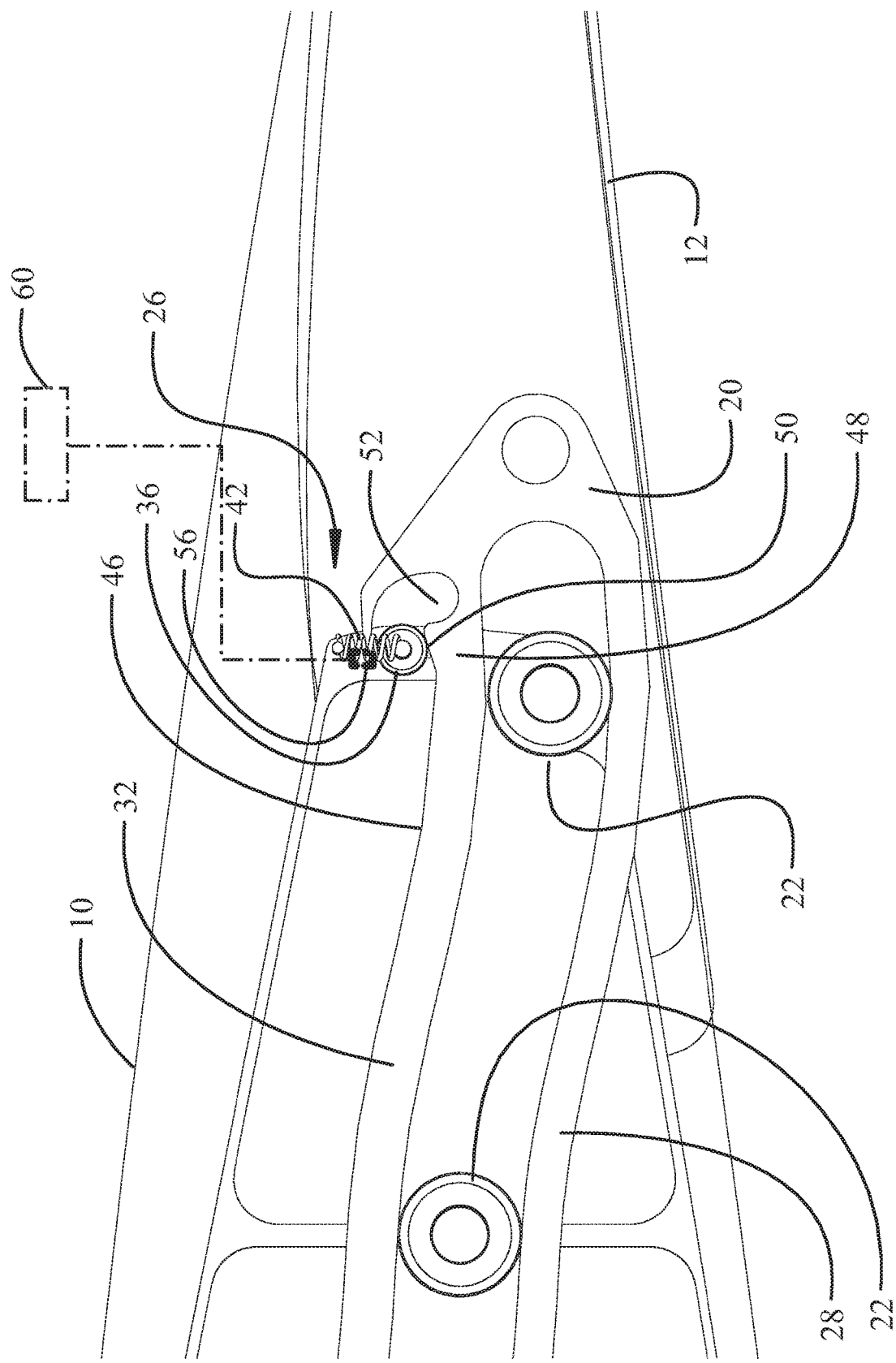
FIGS. 7A-7C are detailed side views of the elements of the first exemplary implementation in an over-travel position, deflection limit position, and captured position.
Figure 7B:
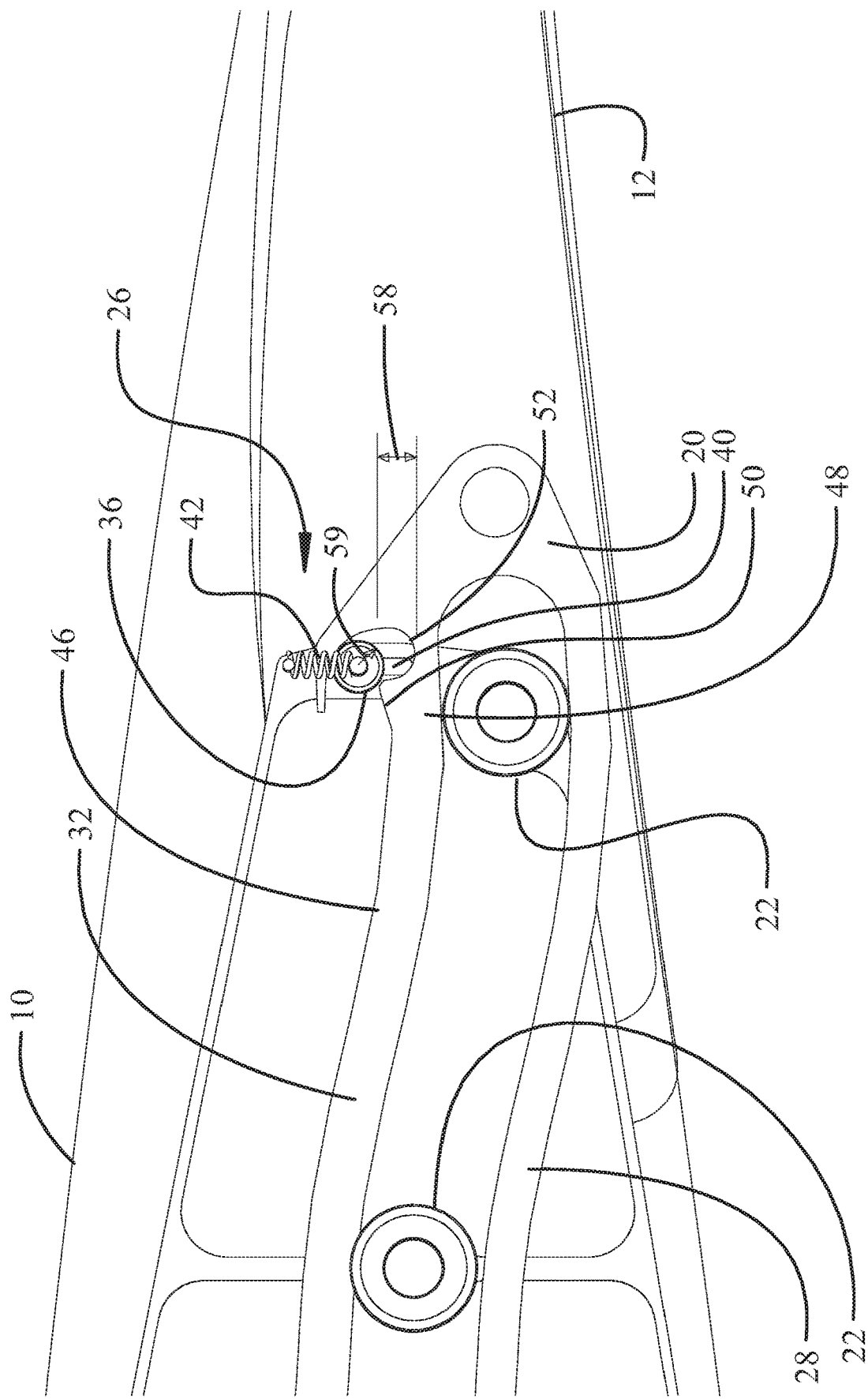
Figure 7C:
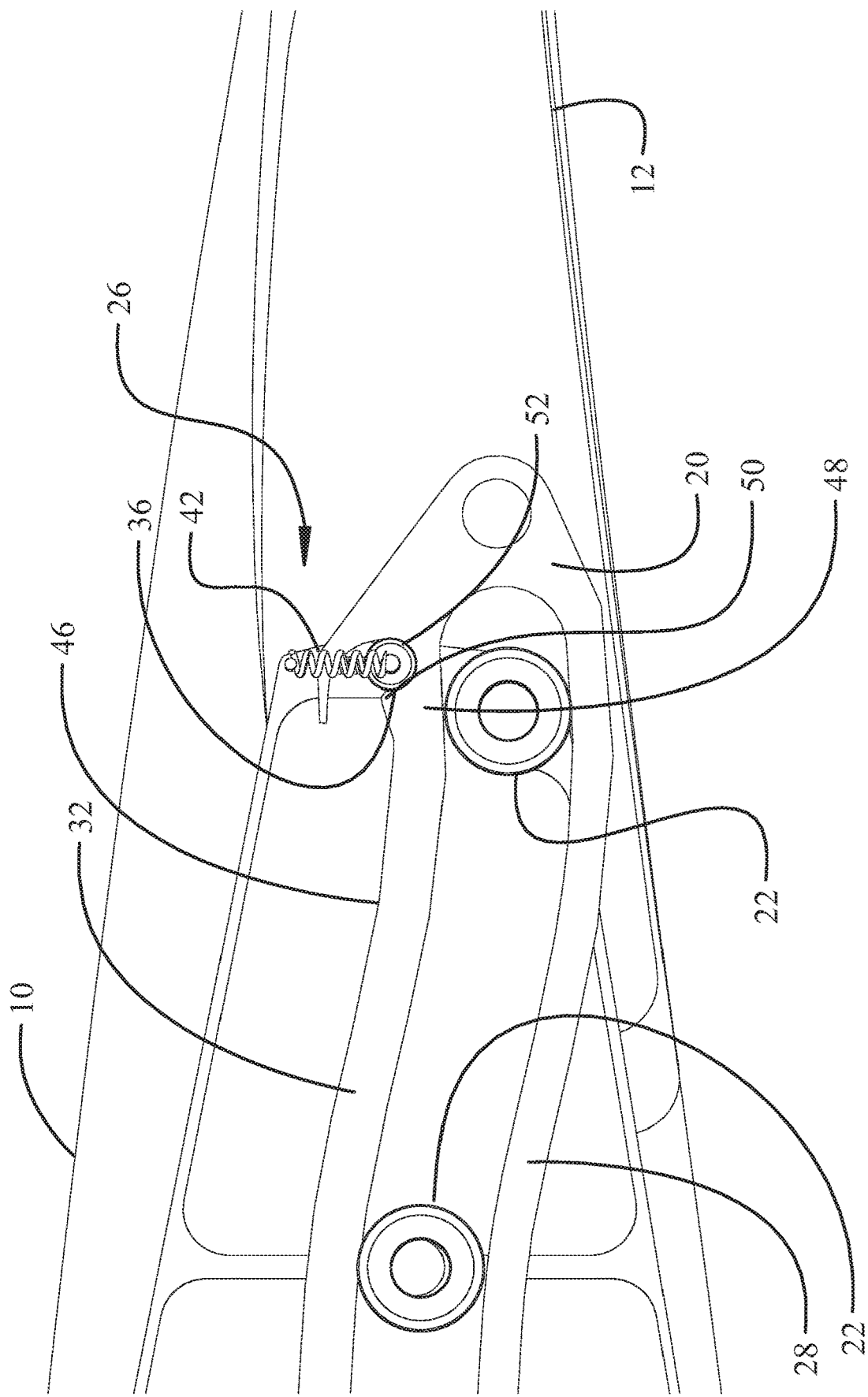

In certain conditions, over-travel of the flap beyond the normal retracted position could allow elements of the flap 12 to intrude into the cove between the flap 12 and wing 10 (seen in FIG. 3). The catcher assembly 26 and transition portion 48 of the track 20 determine a maximum over-travel position of the flap by engaging the catcher roller 36 of the catcher assembly 26 in the detent 52 locking the flap 12 to prevent further over-travel. As seen in FIG. 6, with the flap 12 in a normal retracted position, the catcher assembly 26 has not been engaged by the transition portion 48 in the track profile. The catcher roller 36 is maintained on the upper surface 46 of the upper flange 32 of the track 20 by the springs 42. As seen in FIG. 7A, if the flap 12 has over-travel the catcher assembly 26 engages the transition portion 48 with catcher roller 36 urged upward by ramp 50. A sensor 56 such as a strain gage on spring 42 or a position sensor for catcher axle 38 in guide slots 40 is employed to provide a signal to a control system 60 (shown in phantom) to report an over-travel condition. Continued forward over-travel of the flap 12 reaches a deflection limit as shown in FIG. 7B where catcher roller 36 reaches the end of the ramp 50 in the transition portion 48 and, if over-travel is further continued as seen in FIG. 7C, catcher roller 36 is displaced downwardly by resilient springs 42 and is captured in the detent 52. The catcher assembly 26 locks securing the flap 12. For the first implementation as shown, the detent 52 has a depth 58 greater than a radius 59 of the catcher roller 36 thereby preventing extraction of the catcher roller from the detent.

Figure 8:
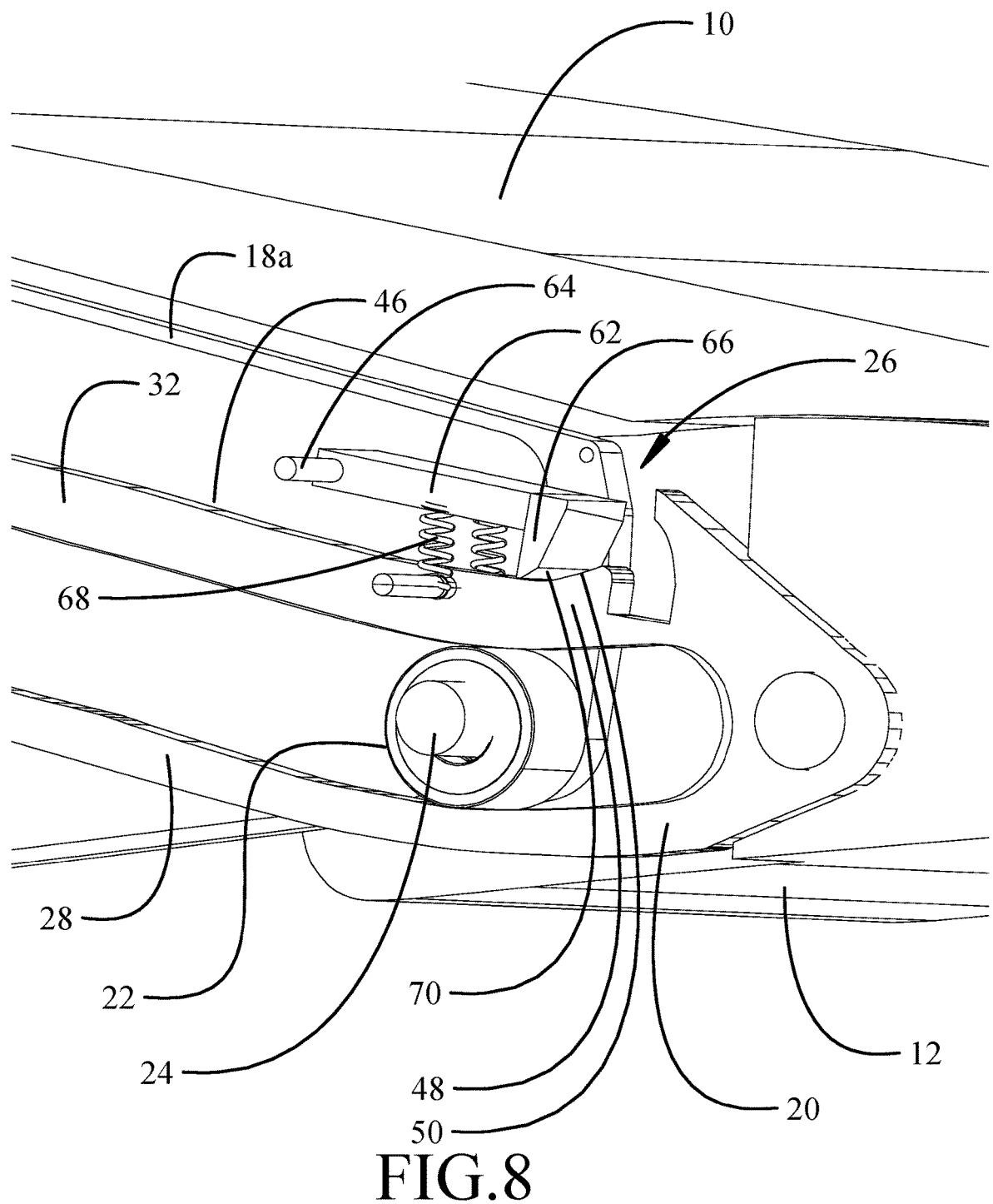
FIG. 8 is a pictorial representation of a second exemplary implementation for use with an auxiliary support control track in the normal retracted position.
Figure 9:
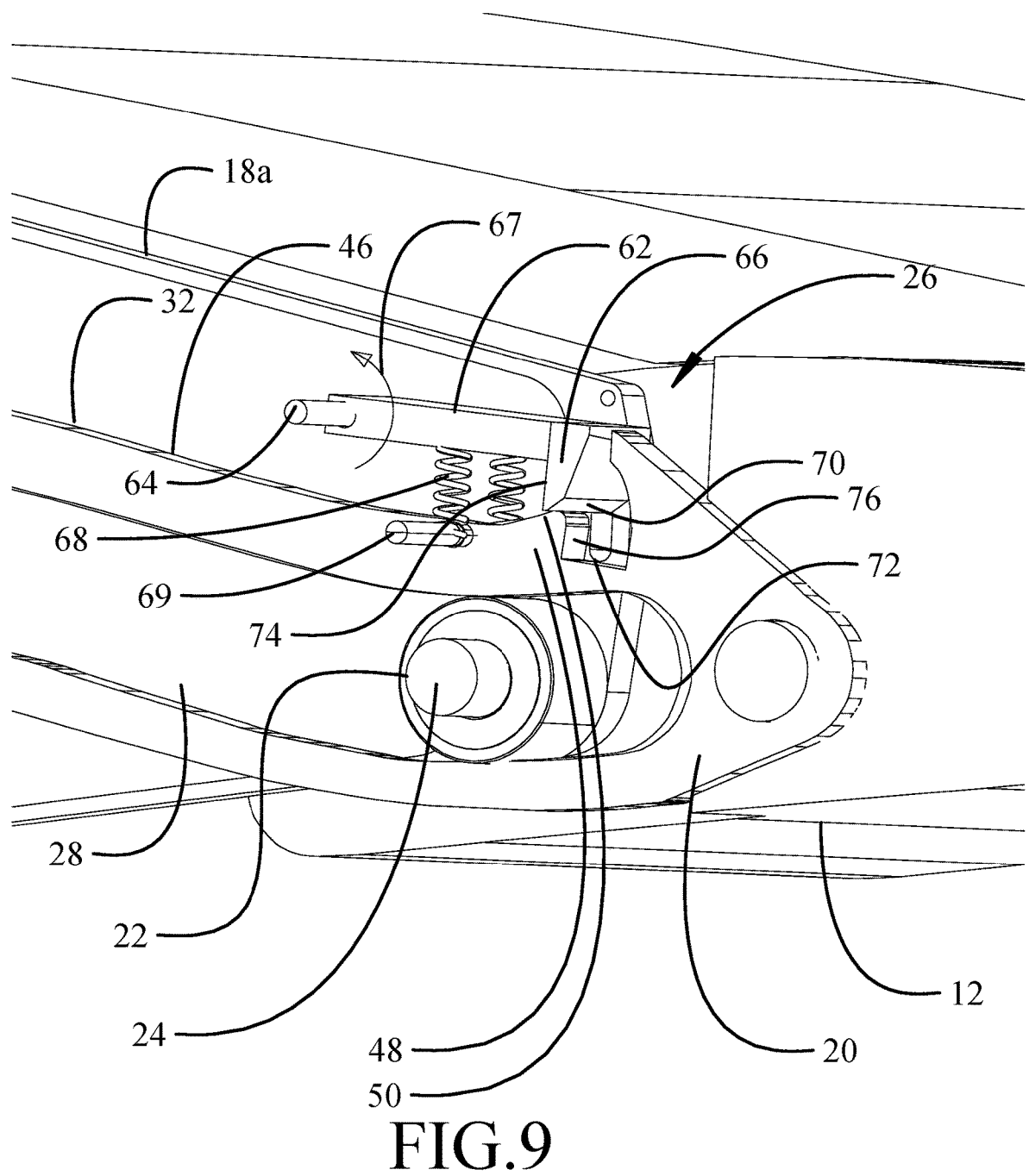
FIG. 9 is a pictorial representation of the second exemplary implementation in the deflection limit position.
Figure 10:
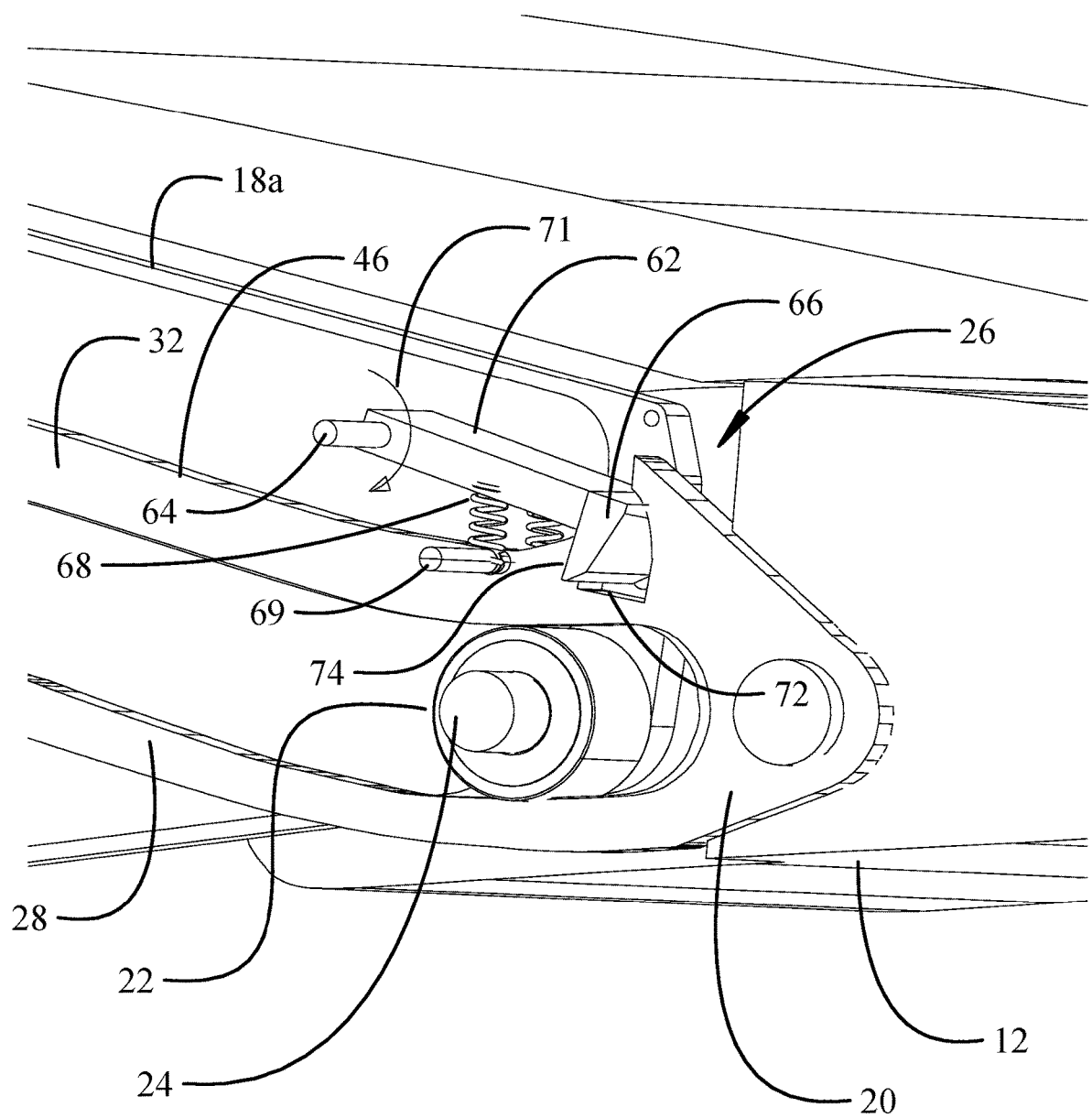
FIG. 10 is a pictorial representation of the second exemplary implementation in the captured position; and, FIG. 11 is a flowchart of a method for arresting flap over-travel employing the exemplary implementations.

Alternative configurations of the catcher are employed for various flap system designs and requirements. A second implementation is shown in FIGS. 8, 9 and 10. The catcher assembly 26 employs a capture arm 62, which is pivotally mounted between the ribs 18a and 18b with an axle 64 to be resiliently rotatable, and a barb 66 extending from the capture arm 62. In the normally retracted position as seen in FIG. 8, the barb 66 rides on the upper surface 46 of the upper flange 32 of the track 20. If the flap 12 moves into an over-travel position as shown in FIG. 9, one or more springs 68 engaged to the capture arm 62 with pins 69 to the inboard and outboard ribs 18a, 18b, resiliently urge a sliding surface 70 (best seen in FIG. 9) of the barb 66 against the ramp 50 in transition portion 48 of the track 20 but allow displacement (arrow 67) of the capture arm 62 as the over-travel urges the catcher assembly 26 onto the transition portion. Upon reaching the maximum over-travel position as seen in FIG. 10, the springs 68 urge rotation (arrow 71) of the capture arm 62 and barb 66 is captured in a detent 72. For the configuration shown, the barb 66 includes an undercut engagement face 74, which is captured by a mating undercut receiving face 76 (seen in FIG. 9) in the detent 72, to resist disengagement.

Figure 11:
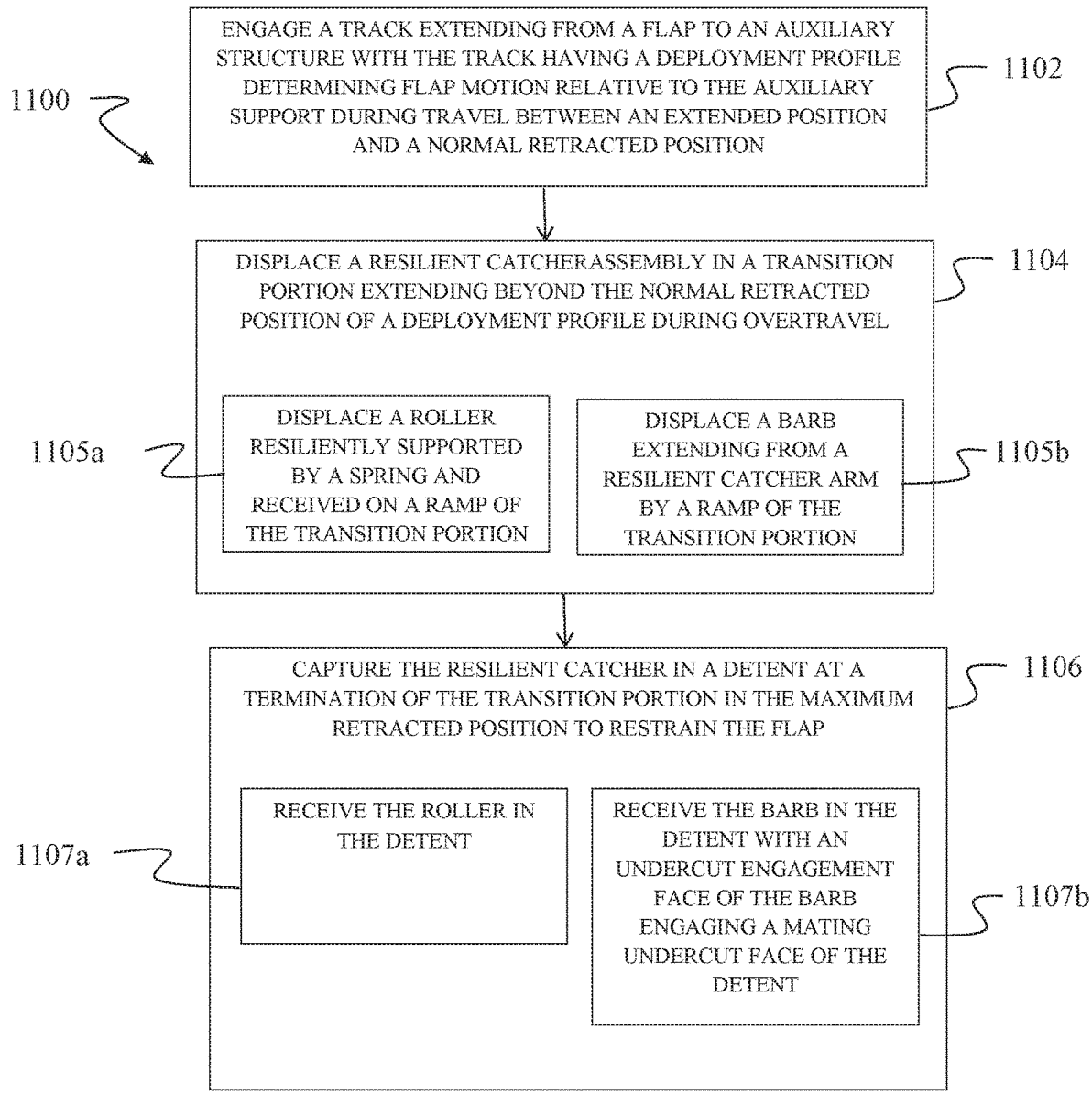

The implementations described herein provide a method 1100 for arresting flap over-travel, as shown in FIG. 11. A track 20 extending from a flap 12 is engaged to an auxiliary support 16, the track 20 having a deployment profile determining flap motion relative to the auxiliary support 16 during travel between an extended position and a normal retracted position, step 1102. The deployment profile has a transition portion 48 extending beyond the normal retracted position. A resilient catcher assembly 26 is displaced in the transition portion 48 of the deployment profile during over-travel of the flap 12 beyond the normal retracted position, step 1104. The catcher assembly 26 employs, in one alternative, a catcher roller 36 resiliently mounted with one or more springs 42 and the catcher roller is received on a ramp 50 of the transition portion 48 to be displaced, step 1105a. In a second alternative, a barb 66 extending from a resilient capture arm 62 is received on the transition portion 48 and displaced by the ramp 50, step 1105b. The resilient catcher assembly 26 is captured in a detent 52,72 at a termination of the transition portion 48 in a maximum retracted position thereby restraining the flap, step 1106. In the first alternative, the catcher roller 36 is received in the detent 52, step 1107a. In the second alternative, the barb 66 is received in the detent 72 with an undercut engagement face 74 of the barb engaging a mating undercut receiving face 76 of the detent 72, step 1107b.

Having now described various embodiments of the invention in detail as required by the patent statutes, those skilled in the art will recognize modifications and substitutions to the specific embodiments disclosed herein. Such modifications are within the scope and intent of the present invention as defined in the following claims.

What is claimed is:

1. A system to arrest flap over-travel comprising:
   a track extending from a flap to engage an auxiliary support, the track having a deployment profile determining flap motion relative to the auxiliary support during travel between an extended position and a normal retracted position, said deployment profile having a transition portion extending beyond the normal retracted position and terminating in a detent; and,
   a resiliently mounted catcher assembly configured to be displaced by the transition portion during over-travel of the flap beyond the normal retracted position and captured in the detent in a maximum retracted position thereby restraining the flap.

2. The system as defined in claim 1 wherein the catcher assembly is mounted to the auxiliary support.

3. The system as defined in claim 1 wherein the catcher assembly reciprocates vertically relative to a direction of travel of the flap.

4. The system as defined in claim 1 wherein the track is secured to and extends forwardly from the flap.

5. The system as defined in claim 4 wherein the track engages at least one air load roller mounted on the auxiliary support.

6. The system as defined in claim 5 wherein the catcher assembly comprises a catcher roller resiliently mounted to the auxiliary support.

7. The system as defined in claim 6 wherein the auxiliary support comprises a first rib spaced from a second rib, said track received between the first rib and second rib and said at least one air load roller supported between the first rib and second rib, and further comprising an axle extending through the catcher roller, said axle mounted to the first rib with a first spring and mounted to the second rib with a second spring.

8. The system as defined in claim 7 wherein the transition portion includes a ramp terminating in the detent, the catcher roller displaced by the ramp in an over-travel condition.

9. The system as defined in claim 8 wherein the track comprises a lower flange having an upper roller surface and an upper flange having a lower roller surface, the at least one air load roller is engaged between the upper roller surface of the lower flange and the lower roller surface of the upper flange and the ramp extends from an upper surface of the upper flange.

10. The system as defined in claim 8 wherein the detent has a depth greater than a radius of the catcher roller.

11. The system as defined in claim 5 wherein the catcher assembly comprises a capture arm rotatably mounted to the auxiliary support, said capture arm having a barb to be received in the detent.

12. The system as defined in claim 11 wherein the barb has an undercut engagement face and the detent has a mating undercut receiving face thereby preventing disengagement when captured.

13. The system as defined in claim 12 wherein the transition portion includes a ramp terminating in the detent, the barb displaced by the ramp in an over-travel condition.

14. The system as defined in claim 13 wherein the track comprises a lower flange having an upper roller surface and an upper flange having a lower roller surface, the at least one air load roller is engaged between the upper roller surface of the lower flange and the lower roller surface of the upper flange and the ramp extends from an upper surface of the upper flange.

15. A system to arrest flap over-travel comprising:
an auxiliary support having a first rib spaced from a second rib with at least one air load roller supported between the first rib and second rib;
a track secured to and extending forwardly from a flap, said track received between the first rib and second rib and engaging the at least one air load roller, the track having a deployment profile determining flap motion relative to the auxiliary support during travel between an extended position and a normal retracted position, said deployment profile having a transition portion extending beyond the normal retracted position and terminating in a detent; and,
a catcher roller having an axle mounted to the first rib with a first spring and mounted to the second rib with a second spring, allowing the catcher roller to be resiliently displaced vertically with respect to a direction of travel of the flap by a ramp in the transition portion during over-travel of the flap beyond the normal retracted position and captured in the detent in a maximum retracted position thereby restraining the flap.

16. The system as defined in claim 15 wherein the track comprises a lower flange having an upper roller surface and an upper flange having a lower roller surface, the at least one air load roller is engaged between the upper roller surface of the lower flange and the lower roller surface of the upper flange and the ramp extends from an upper surface of the upper flange.

17. The system as defined in claim 15 wherein the detent has a depth greater than a radius of the catcher roller.

18. A method for arresting flap over-travel, the method comprising:
engaging a track extending from a flap to an auxiliary support, the track having a deployment profile determining flap motion relative to a support structure during travel between an extended position and a normal retracted position, said deployment profile having a transition portion extending beyond the normal retracted position;
displacing a resiliently mounted catcher in the transition portion of the deployment profile during over-travel of the flap beyond the normal retracted position; and
capturing the resiliently mounted catcher in a detent at a termination of the transition portion in a maximum retracted position thereby restraining the flap.

19. The method as defined in claim 18 wherein the step of displacing comprises receiving a roller in the resiliently mounted catcher on the transition portion and vertically displacing the roller and the step of engaging comprises receiving the roller in the detent.

20. The method as defined in claim 18 wherein the step of displacing comprises receiving a barb, extending from a resilient capture arm, on the transition portion and laterally displacing the barb and the step of capturing comprises receiving the barb in the detent with undercut engagement face of the barb engaging a mating undercut receiving face of the detent.

* * * * *